(12) United States Patent
Samal

(10) Patent No.: US 11,195,026 B2
(45) Date of Patent: Dec. 7, 2021

(54) OBJECT DETECTION AND DISPLAY APPARATUS, MOVEABLE BODY, AND OBJECT DETECTION AND DISPLAY METHOD

(71) Applicant: KYOCERA Corporation, Kyoto (JP)

(72) Inventor: Anil Kumar Samal, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 122 days.

(21) Appl. No.: 16/314,173

(22) PCT Filed: Jun. 15, 2017

(86) PCT No.: PCT/JP2017/022218
§ 371 (c)(1),
(2) Date: Dec. 28, 2018

(87) PCT Pub. No.: WO2018/003532
PCT Pub. Date: Jan. 4, 2018

(65) Prior Publication Data
US 2019/0205662 A1 Jul. 4, 2019

(30) Foreign Application Priority Data
Jun. 29, 2016 (JP) .............................. JP2016-128727

(51) Int. Cl.
*G06K 9/00* (2006.01)
*H04N 5/33* (2006.01)
(Continued)

(52) U.S. Cl.
CPC .......... *G06K 9/00791* (2013.01); *B60K 35/00* (2013.01); *B60R 1/00* (2013.01);
(Continued)

(58) Field of Classification Search
CPC ........ B60K 2370/193; B60K 2370/347; B60K 35/00; B60R 1/00; G02B 2027/0185;
(Continued)

(56) References Cited

U.S. PATENT DOCUMENTS 5,865,265 A * 2/1999 Matsumoto ........... G01S 13/931
180/169
7,949,151 B2 5/2011 Taniguchi et al.
(Continued)

FOREIGN PATENT DOCUMENTS

JP 2007-058805 A 3/2007
JP 2007-310705 A 11/2007
(Continued)

*Primary Examiner* — Michael J Vanchy, Jr.
(74) *Attorney, Agent, or Firm* — Studebaker & Brackett PC

(57) ABSTRACT

An object detection and display apparatus for mounting in a moveable body includes a far infrared camera (10), a display device (30), and a controller (22) (processor). The controller (22) detects, from a first image outputted by the far infrared camera (10), an image of a display target object at a distance equal to or greater than the distance reached by light from headlights (5) of the moveable body, and causes the display device (30) to display an image element corresponding to the display target object based on the position of the image of the display target object in the first image.

11 Claims, 17 Drawing Sheets

(51) Int. Cl.

| | |
|---|---|
| *G02B 27/01* | (2006.01) |
| *B60K 35/00* | (2006.01) |
| *B60R 1/00* | (2006.01) |
| *G03B 17/02* | (2021.01) |
| *G03B 7/00* | (2021.01) |
| *H04N 5/225* | (2006.01) |
| *H04N 7/18* | (2006.01) |
| *G03B 15/00* | (2021.01) |
| *G03B 7/28* | (2021.01) |
| *G03B 17/18* | (2021.01) |
| *G06F 3/0481* | (2013.01) |

(52) U.S. Cl.
CPC ........... *G02B 27/0179* (2013.01); *G03B 7/00* (2013.01); *G03B 7/28* (2013.01); *G03B 15/00* (2013.01); *G03B 17/02* (2013.01); *H04N 5/225* (2013.01); *H04N 5/33* (2013.01); *H04N 7/18* (2013.01); *B60K 2370/193* (2019.05); *B60K 2370/347* (2019.05); *G02B 2027/0185* (2013.01); *G03B 17/18* (2013.01); *G06F 3/04817* (2013.01)

(58) Field of Classification Search
CPC .... G02B 27/0179; G03B 15/00; G03B 17/02; G03B 17/18; G03B 7/00; G03B 7/28; G06F 3/04817; G06K 9/00791; H04N 5/225; H04N 5/33; H04N 7/18
See application file for complete search history.

(56) References Cited

U.S. PATENT DOCUMENTS

| | | | |
|---|---|---|---|
| 9,061,632 B2 | 6/2015 | Toyofuku | |
| 2006/0043295 A1* | 3/2006 | Satou | G02B 23/12 250/330 |
| 2008/0130954 A1 | 6/2008 | Taniguchi et al. | |
| 2008/0150786 A1 | 6/2008 | Breed | |
| 2008/0260207 A1* | 10/2008 | Nagaoka | G06K 9/00805 382/103 |
| 2010/0079267 A1* | 4/2010 | Lin | B60Q 9/008 340/435 |
| 2012/0320207 A1* | 12/2012 | Toyofuku | B60R 1/00 348/148 |
| 2013/0229513 A1* | 9/2013 | Ichitani | H04N 5/33 348/135 |
| 2014/0226015 A1* | 8/2014 | Takatsudo | H04N 7/18 348/148 |
| 2016/0062115 A1* | 3/2016 | Girschick | G02B 27/01 359/631 |

FOREIGN PATENT DOCUMENTS

| | | | |
|---|---|---|---|
| JP | 2009-298322 A | | 12/2009 |
| JP | 2011-087006 A | | 4/2011 |
| JP | 2011087006 A | * | 4/2011 |
| JP | 2011-091549 A | | 5/2011 |
| JP | 2014-056295 A | | 3/2014 |
| WO | 2013/042767 A1 | | 3/2013 |

* cited by examiner

OBJECT DETECTION AND DISPLAY APPARATUS, MOVEABLE BODY, AND OBJECT DETECTION AND DISPLAY METHOD

CROSS-REFERENCE TO RELATED APPLICATION

The present application claims priority to and the benefit of Japanese Patent Application No. 2016-128727 filed Jun. 29, 2016, the entire contents of which are incorporated herein by reference.

TECHNICAL FIELD

The present disclosure relates to an object detection and display apparatus, a moveable body, and an object detection and display method.

BACKGROUND

A variety of devices, such as radar, cameras that perform image recognition, and the like are now being installed in moveable bodies, including vehicles, to improve driving safety of the moveable bodies. For example, these systems identify an obstacle ahead and are used for warning the driver or for automatic control.

A far infrared camera that captures images using far infrared radiation emitted by an object can capture images even in the absence of sunlight at night and can therefore be used for driving support at night. For example, patent literature (PTL) 1 proposes a system that forms patterns from the shapes of images based on far infrared radiation emitted by pedestrians and uses pattern matching to extract pedestrians from images captured using far infrared radiation.

CITATION LIST

Patent Literature

PTL 1: JP200758805A

SUMMARY

An object detection and display apparatus according to an embodiment of the present disclosure is for mounting in a moveable body. The object detection and display apparatus includes a far infrared camera, a display device, and a processor. The processor detects, from a first image that is an image outputted by the far infrared camera, an image of a display target object at a distance equal to or greater than a first distance reached by light from the headlights of the moveable body. The processor causes the display device to display an image element corresponding to the display target object based on the position of the image of the display target object in the first image.

A moveable body according to an embodiment of the present disclosure includes an object detection and display apparatus. The object detection and display apparatus includes a far infrared camera, a display device, and a processor. The processor detects, from a first image that is an image outputted by the far infrared camera, an image of a display target object at a distance equal to or greater than a first distance reached by light from headlights. The processor causes the display device to display an image element corresponding to the display target object based on the position of the image of the display target object in the first image.

An object detection and display method according to an embodiment of the present disclosure includes acquiring a first image using far infrared radiation. The object detection and display method includes detecting, from the first image, an image of a display target object at a distance equal to or greater than a first distance reached by light from headlights of a moveable body. The object detection and display method includes displaying an image element corresponding to the display target object based on the position of the image of the display target object in the first image.

DETAILED DESCRIPTION

Figure 1:
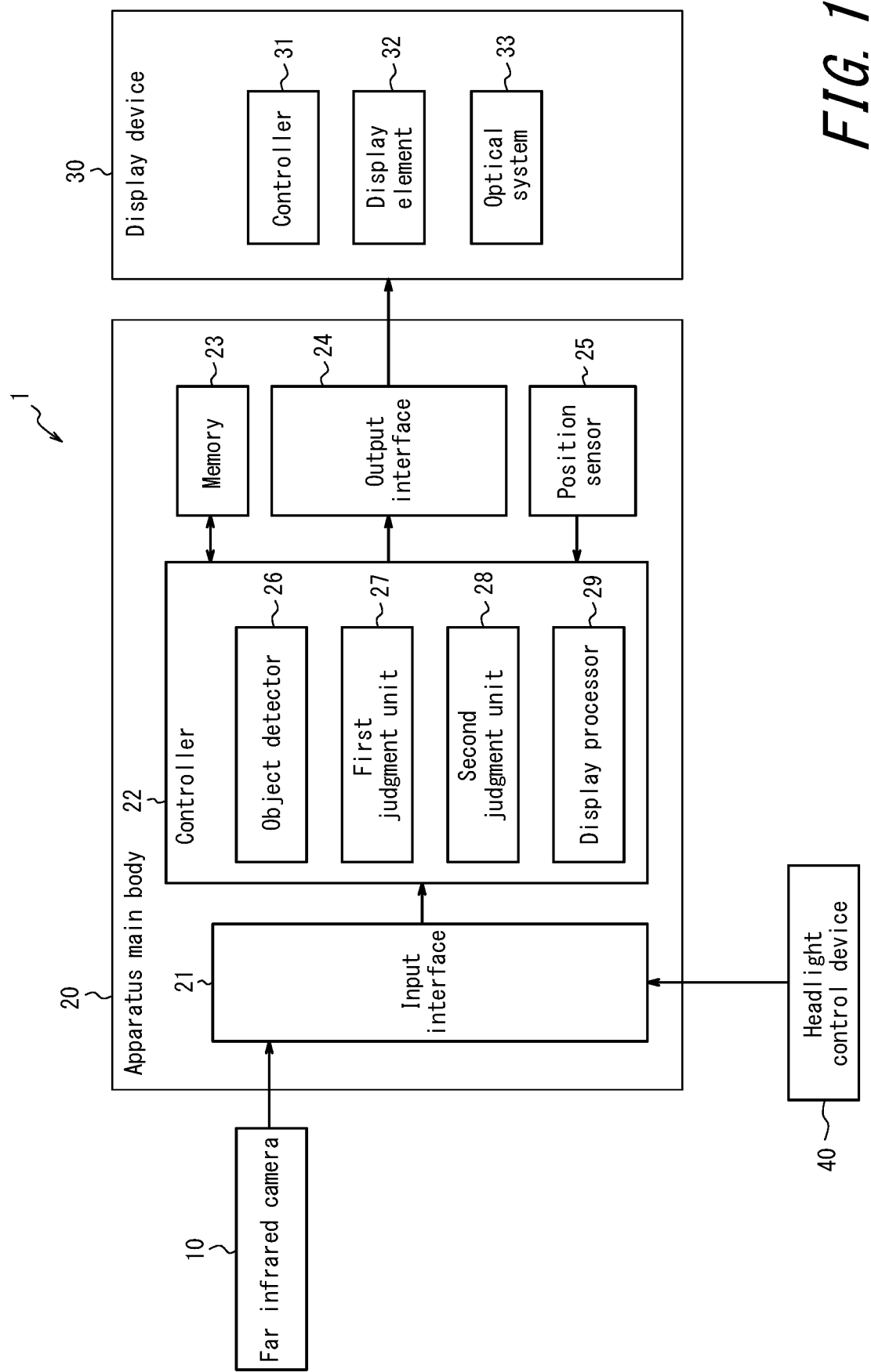
FIG. 1 is a block diagram schematically illustrating the configuration of an object detection and display apparatus according to a first embodiment.

If an object is located in a region sufficiently reachable at night by light from the headlights of a moveable body that includes a far infrared camera, then the driver can recognize the object on the road with the naked eye, without the need for a display device to display an image from the far infrared camera. In this case, it is more natural for the driver to see an actual object directly with the naked eye than to see an image specially processed by the display device. Hence, far infrared images are not very necessary. When an object is in a region not sufficiently lighted by headlights or the like, an image captured by a far infrared camera renders an object that is impossible or difficult to see with the naked eye visible and is thus extremely useful. An object detection and display apparatus according to the present disclosure uses a far infrared camera to selectively display objects located in a region not sufficiently reached by light from the headlights.

Embodiments of the present disclosure are described below with reference to the drawings. The drawings referred to below are schematic illustrations. The dimensional ratios and the like in the drawings do not necessarily match the actual dimensions.

First Embodiment

As illustrated in FIG. 1, an object detection and display apparatus 1 of the present disclosure is mounted in a vehicle and includes a far infrared camera 10, an apparatus main body 20, and a display device 30. The vehicle is a type of moveable body. The "vehicle" in the present disclosure includes vehicles that run on the road, in particular automobiles, trucks, buses, motorcycles, trolley buses, and the like. The "vehicle" also includes construction vehicles such as bulldozers, cranes, and backhoes; agricultural vehicles such as tractors; and the like that run on the road. The headlight control device 40 in FIG. 1 is a control device for controlling the headlights of the vehicle.

Figure 2:
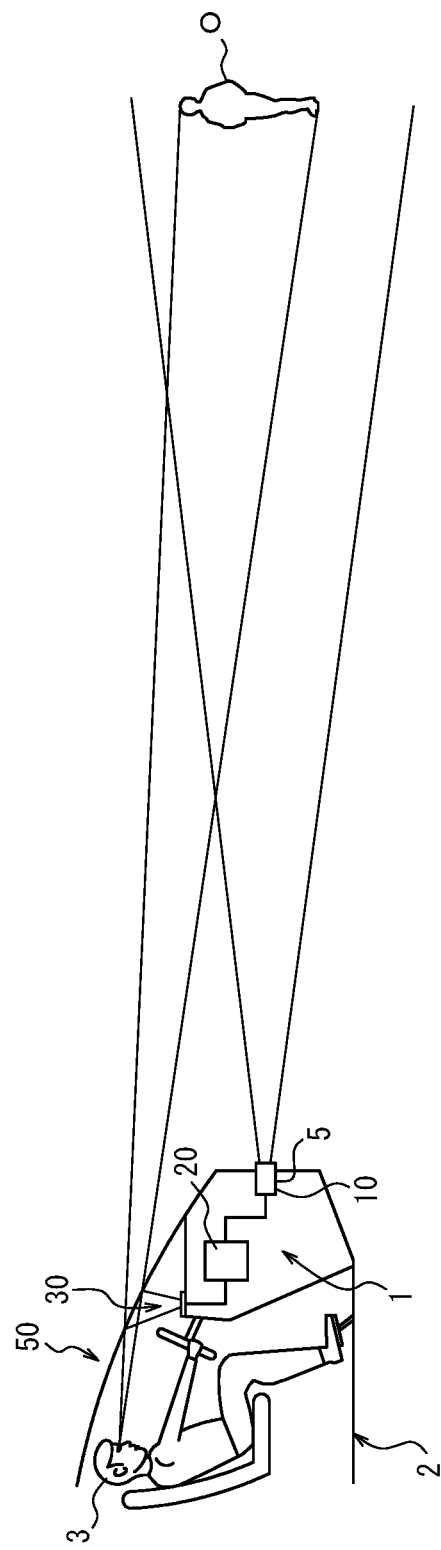
FIG. 2 illustrates the arrangement of constituent elements of an object detection and display apparatus mounted in a vehicle and an example of image display.

As illustrated by the example in FIG. 2, the far infrared camera 10 can be fixed to the front of a vehicle 2 with the optical axis facing ahead of the vehicle 2. The far infrared camera 10 can be fixed at nearly the same height as headlights 5, near the center of the front bumper of the vehicle 2. The far infrared camera 10 is not limited to being installed at this position and may be fixed to the hood (bonnet) or the like of the vehicle 2. The apparatus main body 20 may be embedded in the dashboard of the vehicle 2 and connected electrically to the far infrared camera 10 by a communication cable or the like. The apparatus main body 20 is not limited to being arranged in the dashboard and may be placed in the cabin or at another location. The display device 30 can be used as a head-up display. The display device 30 may be built into the dashboard and project an image towards a front windshield 50 of the vehicle 2. The image is projected to be visible in the field of view of a driver 3. The display device 30 is connected electrically to the apparatus main body 20 by a communication cable or the like. Details of each constituent element are described below.

In FIG. 1, the far infrared camera 10 is a camera that captures an image using far infrared radiation. Far infrared radiation is an electromagnetic wave with a wavelength of approximately 4 µm to 1 mm, emitted from an object in accordance with temperature. A camera that detects light in a wavelength band of approximately 8 µm to 14 µm, for example, may be used as the far infrared camera 10. The wavelength band of the far infrared camera 10 is not limited to this example. Light in a completely different wavelength band, or in another wavelength band including this example wavelength band, may be captured. Germanium, silicon, or zinc sulfide, for example, may be used as optical members, such as lenses, that constitute the far infrared camera 10. Other materials may be used as the material of the optical members in accordance with the wavelength of far infrared radiation in use. A microbolometer-type detector can be used as the image sensor of the far infrared camera 10. Another thermal infrared sensor, such as a thermoelectric element or a pyroelectric element, or a quantum infrared image sensor may be used as the image sensor of the far infrared camera 10.

The far infrared camera 10 captures far infrared images at a predetermined frame rate. In the present application, an image obtained by forming far infrared radiation emitted by an object into an image with the far infrared camera 10 is referred to as a far infrared image. The far infrared image is also referred to as a first image. The frame rate of the far infrared camera 10 can be 30 frames per second (fps) or 60 fps. The frame rate may also be approximately 10 fps. The frame rate can be set appropriately in accordance with design. The far infrared camera 10 may change the frame rate in accordance with the speed of the vehicle 2.

The apparatus main body 20 receives input from the far infrared camera 10, detects an object, and generates a display image for display by the display device 30. The apparatus main body 20 includes an input interface 21, a controller 22, a memory 23, an output interface 24, and a position sensor 25.

The input interface 21 is an input interface for inputting the first image from the far infrared camera 10 to the apparatus main body 20. The input interface 21 is also an input interface that receives a headlight signal indicating the state of the headlights 5 from the headlight control device 40 of the vehicle 2.

A physical connector or a wireless communication device can be used in the input interface 21. Physical connectors include an electrical connector corresponding to transmission by an electric signal, an optical connector corresponding to transmission by an optical signal, and an electromagnetic connector corresponding to transmission by an electromagnetic wave. Electrical connectors include connectors conforming to IEC 60603, connectors conforming to the USB standard, connectors comprising RCA terminals, connectors comprising S terminals prescribed by EIAJ CP-1211A, connectors comprising D terminals prescribed by EIAJ RC-5237, connectors conforming to the HDMI® standard (HDMI is a registered trademark in Japan, other countries, or both), and connectors comprising a coaxial cable including a BNC connector. Optical connectors include a variety of connectors conforming to IEC 61754. Wireless communication devices include wireless communication devices conforming to standards that include Bluetooth® (Bluetooth is a registered trademark in Japan, other countries, or both) and IEEE802.11. The wireless communication device includes at least one antenna.

The input interface 21 can deliver the first image captured by the far infrared camera 10 and the headlight signal input from the headlight control device 40 to the controller 22.

The controller 22 includes one or more processors. The controller 22 or the processor may include one or more memories that store programs for various processing and store information during calculations. The term "memory" encompasses volatile memory and non-volatile memory. The memory may be configured as a memory independent from the processor and/or a memory built into the processor. The term "processor" encompasses universal processors that execute particular functions by reading particular programs and dedicated processors that are specialized for particular processing. Dedicated processors include application specific integrated circuits (ASICs) for specific applications. Processors also include programmable logic devices (PLDs). PLDs include field-programmable gate arrays (FPGAs). The controller 22 may be either a system-on-a-chip (SoC) or a system in a package (SiP) with one processor or a plurality of processors that work together.

The controller 22 may control activation and deactivation of the far infrared camera 10. For example, the controller 22 may initiate an object detection and display process using output from the far infrared camera 10 when a headlight signal indicating that the headlights 5 are on is received from the headlight control device 40.

The controller 22 includes the following functional blocks: an object detector 26, a first judgment unit 27 that judges the type of object, a second judgment unit 28 that judges the distance, and a display processor 29. Each functional block may be a hardware module or a software module. The controller 22 can execute the operations that can be performed by each functional block. The operations performed by each functional block can also be referred to as operations performed by the controller 22. The controller 22 itself may execute the processing that the controller 22 causes any of the functional blocks to perform.

The object detector 26 detects an image of an object from the first image captured by the far infrared camera 10. The image of the object is also referred to as an object image. A variety of methods, such as edge detection and region segmentation, may be used for detection of the object image. For example, the object detector 26 stores a far infrared image in which no object is present ahead. When a first image including an image of an object is input, the object detector 26 calculates the difference from the far infrared image in which no object is present. Furthermore, the object detector 26 can binarize the image obtained as the difference, treat small groups of pixels in the binary image as noise, remove the noise, and recognize the remaining collection of pixels as an object image. The object detector 26 may perform object detection after subjecting the first image captured by the far infrared camera 10 to any process, such as distortion correction, brightness adjustment, contrast adjustment, or the like.

The first judgment unit 27 determines the type of object from the object image detected by the object detector 26. The object detector 26 has image patterns of object images, such as automobiles, pedestrians, and bicycles, and can determine the type of object using pattern matching. The first judgment unit 27 may acquire the image patterns as necessary from image patterns stored in the memory 23. For example, a vertically long pattern with two legs can be judged to be a pedestrian. The first judgment unit 27 may be integrated with the object detector 26. In other words, detection of an object by the object detector 26 may be performed on the basis of matching with predetermined image patterns of object images. In this case, the object detector 26 both detects an object and decides the type of object.

The second judgment unit 28 judges the distance to the detected object. In the present embodiment, the second judgment unit 28 judges the distance on the basis of the type of object judged by the first judgment unit 27 and the size of the image of the object in the first image. For example, when the object is an automobile, the distance can be estimated on the basis of the width of the detected vehicle 2 in the first image, considering how automobiles in Japan, for example, tend to be around 170 cm to 180 cm wide. Similarly, when the detected object is a pedestrian, the distance can be estimated on the basis of the vertical length in the first image.

The display processor 29 decides whether the object detected by the object detector 26 is to be displayed by the display device 30 in accordance with the distance judged by the second judgment unit 28. The display processor 29 does not display an indication of the object with the display device 30 when the distance to the object judged by the second judgment unit 28 is shorter than the distance reached by light from the headlights 5. In the present application, the distance reached by light from the headlights 5 is referred to as the distance reached by light. The distance reached by light is also referred to as a first distance. The distance from the vehicle 2 to the object is referred to as a second distance. When the second distance judged by the second judgment unit 28 is equal to or greater than the first distance, the display processor 29 judges that the object is a display target object and causes the display device 30 to display an image element corresponding to the object. The image element refers to a simple representation of the object as a figure, a mark, a symbol, or the like. The display processor 29 can also extract the image of the display target object from the first image and cause the display device 30 to display the extracted image as the image element. The display target object is an object to be displayed by the display device 30 as an image element corresponding to the object.

When the display processor 29 causes the display device 30 to display the image element corresponding to the object, the display processor 29 selects the image element on the basis of the type of object determined by the first judgment unit 27. The image element may be an icon. The display processor 29 may generate an image to output to the display device 30 so that an image of the icon is displayed at a position corresponding to the position of the image of the display target object detected by the object detector 26. The image data of the icon can be stored in the memory 23. The display processor 29 can read the data of the icon image from the memory 23 as necessary.

The memory 23 is a storage device storing data, such as image data necessary for processing executed by the object detection and display apparatus 1. Images captured by the far infrared camera 10 can be stored temporarily in the memory 23. Patterns used by the first judgment unit 27 to judge the type of object can be stored in the memory 23. Icon images used when the display processor 29 generates an image signal for the display device 30 to display the display target object can be stored in the memory 23. Volatile memory such as dynamic random access memory (DRAM) and static random access memory (SRAM), non-volatile memory such as flash memory, and the like can be used in the memory 23.

The output interface 24 is an output interface for outputting image signals from the apparatus main body 20 to the display device 30. A physical connector or a wireless communication device can be used in the output interface 24. In the present embodiment illustrated in FIG. 1, the output interface 24 and the input interface 21 are separate, but this configuration is not limiting. The input interface 21 and the output interface 24 may be one communication interface. A physical connector or a wireless communication device can be used in the communication interface.

The position sensor 25 is a sensor for detecting the position of the head of the driver 3 of the vehicle 2. The driver 3 is the user of the object detection and display apparatus 1. A camera installed in the cabin of the vehicle 2 can be used as the position sensor 25. The head position information measured by the position sensor 25 can be used for automatically aligning the position of the icon displayed by the display device 30 with the correct position of the display target object in the field of view of the driver 3. The position sensor 25 is not an essential component. Without using the position sensor 25, the image projection position of the display device 30 can be adjusted in accordance with a predetermined position of the head of the driver 3 while driving.

A head-up display can be used as the display device 30. The display device 30 as a head-up display may be configured to include a controller 31, a display element 32, and an optical system 33.

The controller 31 controls the display device 30 overall. For example, the controller 31 receives an image signal outputted by the apparatus main body 20 and controls an image to be displayed on the display element 32, the light emission intensity of the light source of the display element 32, and the like. The controller 31 may, for example, be configured by a processor or microcomputer capable of executing application software. The controller 31 may include a storage device storing data such as programs for operating the display element 32. The storage device may, for example, be a semiconductor memory. The storage device may function as a working memory of the controller 31. When the orientation of the optical elements, such as mirrors, constituting the optical system 33 are adjustable, the controller 31 controls the optical system 33 by controlling the adjustable optical elements of the optical system 33. The controller 31 can control the optical system 33 to adjust the image projection position on the basis of position information of the head of the driver 3 acquired by the position sensor 25 of the apparatus main body 20.

The display element 32 displays an image to be projected by the optical system 33. The display element 32 may, for example, include a transmissive liquid crystal device such as a liquid crystal display (LCD), a reflective liquid crystal device such as liquid crystal on silicon (LCOS), or a self-luminous display element such as an organic electroluminescence display (OLED). Alternatively, the display element 32 may include a mirror device, such as a digital mirror device (DMD), a micro electro mechanical systems (MEMS) mirror, and the like. The case of using an LCD or the like in the display element 32 is described below.

The display element 32 receives the image signal generated by the display processor 29 from the output interface 24 of the apparatus main body 20. The icon to be displayed and information on its display position are included in the image signal. The display element 32 can be installed inside the dashboard. The display element 32 is not limited to being installed inside the dashboard and may, for example, be arranged above the dashboard or near the rear-view mirror of the vehicle 2.

The optical system 33 can include a concave mirror, arranged inside the dashboard, and the front windshield 50. The side of the front windshield 50 facing the driver 3 may partially reflect light in the visible light region. The optical system 33 reflects the image displayed on the display element 32 at the concave mirror and the front windshield 50 to project a virtual image of the image displayed on the display element 32 in a visible manner within the field of view of the driver 3. The surface of the front windshield 50 may be processed or coated to reflect light from the display element 32. The optical system 33 overlays a virtual image of the image displayed on the display element 32 on the scenery ahead that is visible through the front windshield 50 to project the virtual image within the field of view of the driver 3. The scenery in front is also referred to below as the foreground. The optical system 33 is not limited to the combination of the concave mirror and the front windshield 50 and may include a lens or another optical element. A combiner can be used instead of the front windshield 50 to project the virtual image. The combiner is a one-way mirror, independent from the front windshield, for reflecting the image of the head-up display.

The headlight control device 40 is a control device built into the vehicle 2 for controlling the headlights 5. As the headlight signal, the headlight control device 40 transmits a signal indicating the on or off state of the headlights 5, and a signal indicating mode selection information when the headlights 5 are on, to the input interface 21 of the apparatus main body 20. The mode selection information indicates the mode that the headlights 5 are in, including a high beam mode and a low beam mode. The headlight signal may be transmitted when the state of the headlights 5 is changed, such as when the switch of the headlights 5 is operated. The headlight signal may be transmitted continuously at predetermined intervals.

Figure 3:
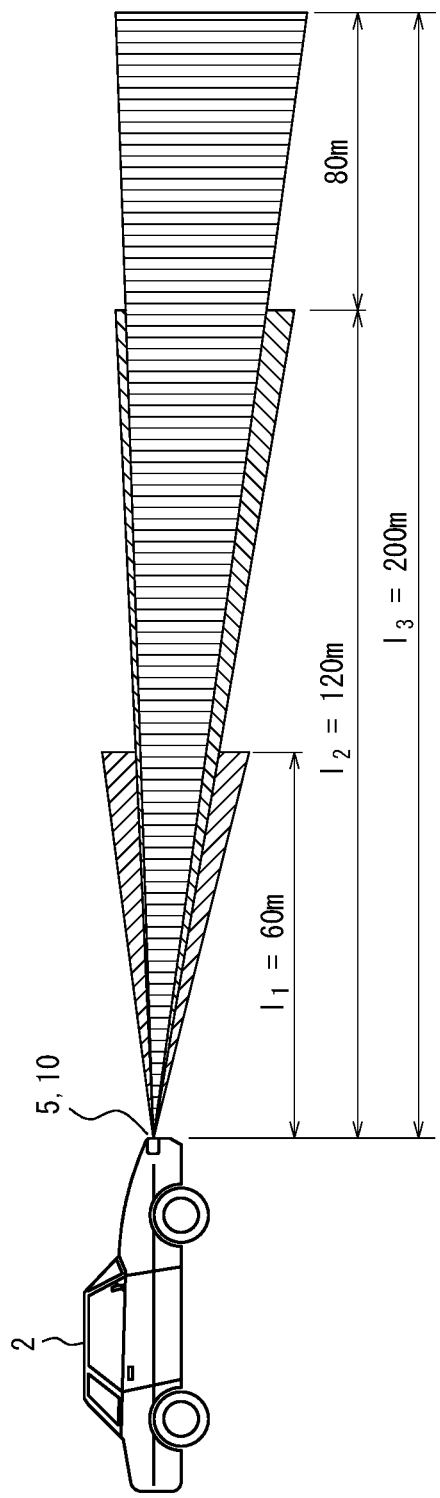
FIG. 3 illustrates the distance reached by light from a vehicle's headlights and the distance at which an object can be detected using far infrared radiation.

The distance reached by light (first distance) of the headlights 5 of the vehicle 2 and the distance at which an object is detectable by the far infrared camera 10 are now described with reference to FIG. 3. The headlights are also referred to as headlamps. The high beam mode of the headlights is also referred to as a "driving beam". The safety standards for road transport vehicles in Japan specify that the high beam mode should allow recognition at night of an obstacle located 100 m ahead. The low beam mode is also referred to as a "passing beam". The aforementioned safety standards specify that the low beam mode should allow recognition at night of an obstacle located 40 m ahead, without hampering other traffic.

In a typical vehicle, the distance reached by light in the low beam mode is approximately 60 m. The distance reached by light in the low beam mode is referred to below as the low beam distance $l_1$. The distance reached by light in the high beam mode is approximately 120 m. The distance reached by light in the high beam mode is referred to below as the high beam distance $l_2$. The low beam distance $l_1$ is the first distance in low beam mode and the high beam distance $l_2$ is the first distance in high beam mode. When the headlights of the vehicle are in low beam mode at night, an object can be seen in the headlights if the distance from the vehicle to the object (second distance) is within 60 m. If the second distance exceeds 60 m, however, it becomes difficult to see the object. When the headlights of the vehicle are in high beam mode at night, an object can be seen in the headlights if the distance from the vehicle to the object (second distance) is within 120 m. If the second distance exceeds 120 m, however, it becomes difficult to see the object.

The first distance in the present application can be a distance predetermined in accordance with the mode selection information of the headlights 5, as described above. Another method is to set the first distance to the maximum distance reached by light from the headlights 5 as actually observed from the vehicle 2. The light from the headlights 5 gradually reduces with increased distance from the vehicle 2. Accordingly, a threshold may be set on the intensity of light from the headlights 5 reflected by the object observed from the vehicle 2, and the first distance may be set to the distance at which the intensity of reflected light falls below the threshold. The threshold can be set to the intensity of light at which the driver 3 cannot easily see an object at night.

A distance $l_3$ at which an object can be detected by the far infrared camera 10 is approximately 200 m. Consequently, the far infrared camera 10 is effective for detecting objects located at a distance of 60 m to 200 m from the vehicle 2 when the headlights 5 are in low beam mode. The far infrared camera 10 is also effective for detecting objects located at a distance of 120 m to 200 m from the vehicle 2 when the headlights 5 are in high beam mode.

An example of an object detection and display method for using the object detection and display apparatus 1 to display an image element corresponding to a display target object in the field of view of the driver 3 is described with reference to the flowchart in FIG. 4.

The far infrared camera 10, the components of the apparatus main body 20, and the display device 30 are activated when the controller 22 of the apparatus main body 20 receives a headlight signal from the headlight control device 40 indicating that the headlights 5 are on (step S101).

The controller 22 receives a headlight signal from the headlight control device 40 including selection information indicating whether the headlights 5 are in high beam mode or low beam mode (step S102). The controller 22 performs the following processing in accordance with the mode of the headlights 5 indicated by the received selection information.

The controller 22 acquires a first image from the far infrared camera 10 (step S103). The controller 22 performs the following processing sequentially in the object detector 26, the first judgment unit 27, the second judgment unit 28, and the display processor 29 on the basis of the acquired first image.

The object detector 26 detects an object image from the first image along with position information in the image (step S104).

Figure 5:
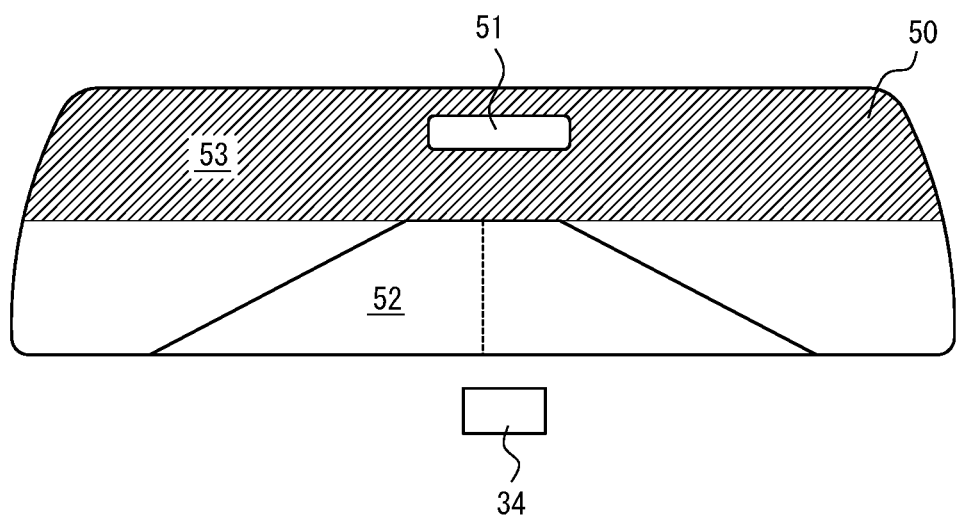
FIG. 5 illustrates an example of the scenery ahead seen through the windshield at night from the perspective of the driver.

In the absence of sunlight at night, when there is little or no light other than the headlights 5, then the foreground is visible in the field of view of the driver 3, as illustrated in FIG. 5, through the front windshield 50. FIG. 5 also depicts a mirror 51 inside the vehicle and a projection portion 34 of the display device 30. The projection portion 34 is a window through which light from the display element 32 in the dashboard is emitted above the dashboard. The projection portion 34 is provided along the optical path of the optical system 33. In the foreground visible to the driver 3, a road surface 52 can be seen up to the first distance, which is the distance reached by light in front of the vehicle 2. The first distance is approximately 60 m when the headlights 5 are in low beam mode and approximately 120 m when the headlights 5 are in high beam mode. A region that is the first distance or greater away is not reached by light and remains dark. This region is referred to as a non-illuminated region 53.

Figure 6:
FIG. 6 is an example of the scenery ahead that can be captured by a far infrared camera.

In the example in FIG. 6, the far infrared camera 10 can capture an image of an object not visible to the human eye in a dark environment. The brightness in the image captured by the far infrared camera 10 differs in accordance with the temperature of the captured object. For example, the road surface 52 is displayed brightly when the road surface temperature rises during the afternoon and remains higher than the surrounding temperature at night. Since the far infrared camera 10 can detect an object up to approximately 200 m ahead, the far infrared camera 10 can also detect object images $O_1$, $O_2$ that were not visible only by the light from the headlights 5. In FIG. 6, the object image $O_1$ is an image of an automobile. In FIG. 6, the object image $O_2$ is an image of a pedestrian. The object detector 26 can detect the object images $O_1$, $O_2$ from the first image outputted by the far infrared camera 10.

The first judgment unit 27 judges the type of object images $O_1$, $O_2$ detected by the object detector 26 (step S105). For example, in the first image in FIG. 6, the first judgment unit 27 judges that the object image $O_1$ is an automobile and that the object image $O_2$ is a pedestrian.

Figure 7:
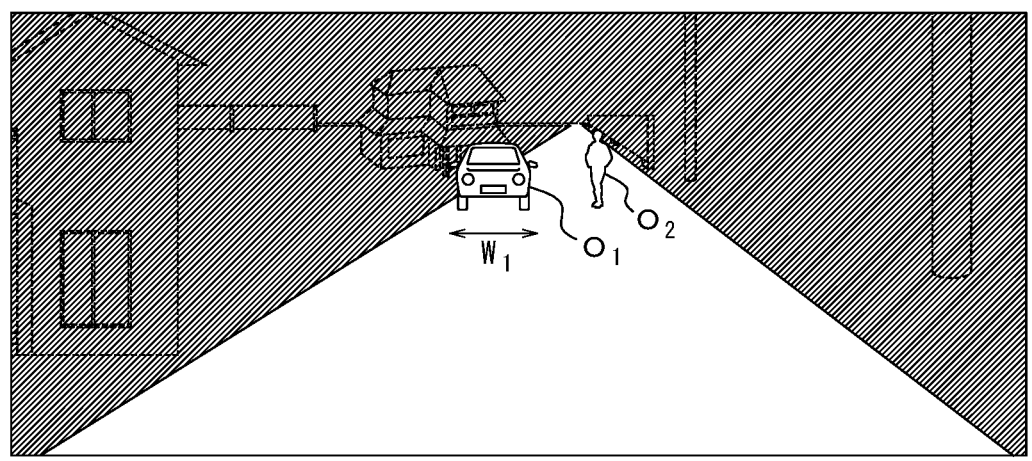
FIG. 7 illustrates a distance determination method based on the size of an object image.

The second judgment unit 28 judges the distance (second distance) to the objects in actual space corresponding to the object images $O_1$, $O_2$ that were detected by the object detector 26 and whose type was judged by the first judgment unit 27 (step S106). FIG. 7 schematically illustrates an example of the first image. The second judgment unit 28 measures a width $w_1$, in pixels, of the object image $O_1$ recognized as an automobile. The second judgment unit 28 uses the width $w_1$ of the object image $O_1$ and a typical automobile width to judge the second distance corresponding to the object image $O_1$. Judgment of distance is not limited to using the automobile width and can also use a person's height. When the object is a bicycle, then the length of the bicycle, the tire diameter, or the like can also be used. The second judgment unit 28 may estimate the distance on the basis of the width of the image of the road where the object images $O_1$, $O_2$ are positioned.

In accordance with the second distance judged by the second judgment unit 28, the display processor 29 decides whether to cause the display device 30 to display image elements corresponding to the object images $O_1$, $O_2$ (step S107). When the mode of the headlights 5 is the low beam mode, the display processor 29 sets the first distance of the headlights 5 to the low beam distance $l_1$, which is the distance reached by light from the headlights 5 in low beam mode. The low beam distance $l_1$ is, for example, 60 m. When the mode of the headlights 5 is the high beam mode, the display processor 29 sets the first distance of the headlights 5 to the high beam distance $l_2$, which is the distance reached by light from the headlights 5 in high beam mode. The high beam distance $l_2$ is, for example, 120 m. When judging that the distance to an object corresponding to the object images $O_1$, $O_2$ is at least the first distance of the headlights 5, the display processor 29 designates the object as a display target object.

Figure 8:
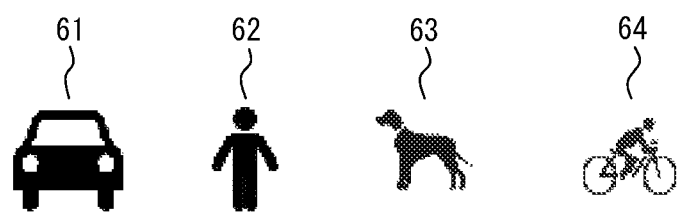
FIG. 8 illustrates example icons displayed in a display image.

When it is judged in step S107 that the object is a display target object, the display processor 29 selects an icon, which is an image element, on the basis of the type of object judged by the first judgment unit 27. FIG. 8 illustrates example icons. The icons may include an automobile icon 61, a human icon 62, an animal icon 63, a bicycle icon 64, and the like. These icons 61 to 64 are not limiting, and a variety of icons can be used.

The display processor 29 identifies the positions at which the display target objects are to be displayed in the field of view of the driver 3 on the basis of the position information of the object images $O_1$, $O_2$ in the first image. The display processor 29 calculates information of display positions on the display element 32 for displaying the icons at the identified positions. The position at which a display target object is to be displayed in the field of view of the driver 3 is the position at which the display target object would be seen in a bright environment. The display processor 29 outputs each selected icon and the position information on the display element 32 to the display device 30 through the output interface 24. In this way, the icon is displayed at an appropriate position on the display element 32 and is projected onto the position for display in the field of view of the driver 3 (step S108).

Figure 9:
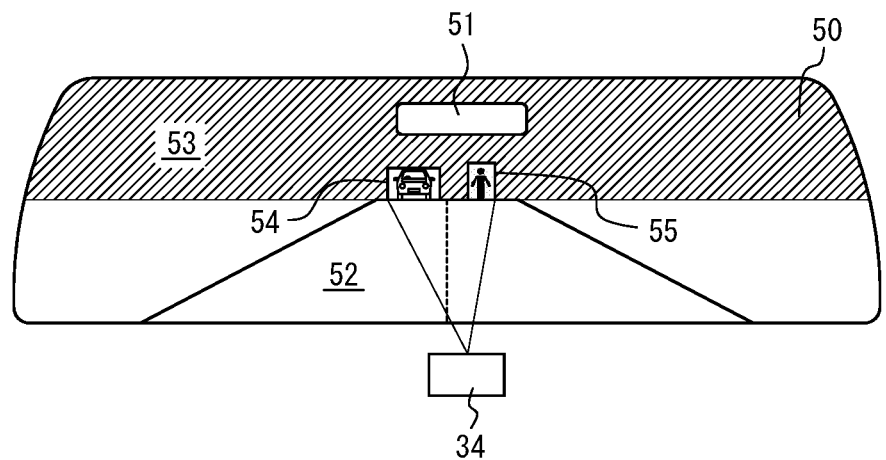
FIG. 9 illustrates a virtual image of icons displayed in overlap with the scenery ahead visible through the front windshield.

FIG. 9 schematically illustrates images that are projected by the display device 30 onto the front windshield 50 of the vehicle 2 through the projection portion 34 and are visible to the driver 3. In the non-illuminated region 53, the vehicle icon 54 is displayed at a position where a vehicle 2 should be visible in a bright environment, and the human icon 55 is displayed at a position where a pedestrian should be visible.

Figure 10:
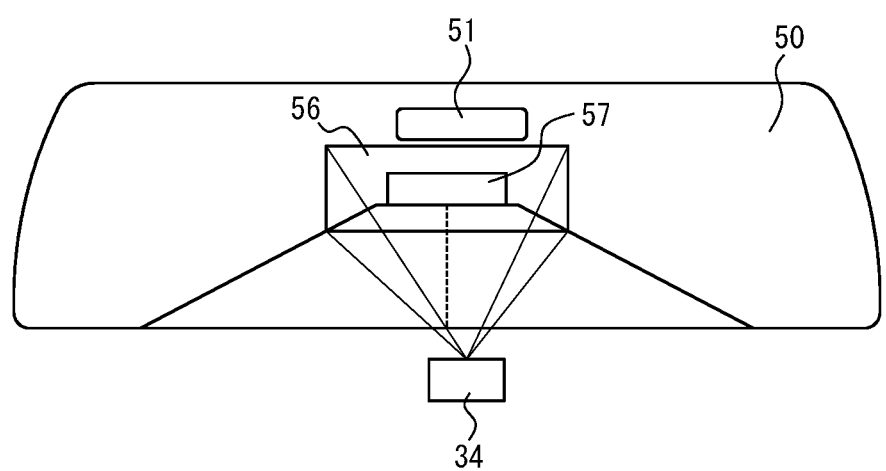
FIG. 10 illustrates display regions of icons in high beam mode and low beam mode.

The region of the front windshield 50 onto which the display device 30 projects an icon differs between the low beam mode and the high beam mode of the headlights 5. When the vehicle 2 is traveling straight on the road as illustrated in FIG. 10, the driver 3 can only see the foreground relatively close to the vehicle 2 if the headlights 5 are in low beam mode. Consequently, a first projection region 56 is set as in FIG. 10 as the region in which an image is projected in low beam mode. When the headlights 5 are in high beam mode, the driver 3 can see the foreground farther away. Consequently, a second projection region 57 is the region in which an image is projected in high beam mode and is narrower than the first projection region 56.

When the object is judged not to be a display target object in step S107, the display processor 29 does not provide the display instruction in step S108. When a plurality of objects is detected by the object detector 26, the second judgment unit 28 judges the distance to each object. It is then determined whether each object is a display target object, and only the display target objects are displayed.

After the display processor 29 instructs the display device 30 to display an icon or judges not to perform display in step S107, the processing by the controller 22 returns to step S102, except when an instruction to end the system has been received (step S109). Subsequently, the controller 22 repeats the processing from step S102 to step S109. Receipt of an instruction to end the system refers, for example, to cases such as the power to the apparatus main body 20 being cut off when a headlight signal indicating that the headlights 5 are off is received.

As described above, the present embodiment uses the first image outputted by the far infrared camera 10 to allow objects in a dark location not visible to the naked eye to be seen as icons. A display based on the first image is selectively made only in the region not reached by light from the headlights 5, with icons based on the infrared image not being displayed in the region reached by light from the headlights 5. Such display is easy to understand. When the second distance from the vehicle 2 to an object is less than the first distance reached by light from the headlights 5, the display device 30 does not display an icon corresponding to the object. This prevents both a visible object and an icon from being in the field of view of the driver 3, which could be difficult to see. Furthermore, an image element corresponding to a display target object is displayed on the basis of the position of the image of the display target object in the first image, allowing the driver 3 to see an icon of the display target object at the proper position. Use of an icon to display the display target object also yields a simpler, easier to understand display.

In the present embodiment, selection information regarding the high beam mode and low beam mode of the headlights 5 is acquired from the headlight control device 40. Hence, an icon can be displayed in the display region appropriate for the mode of the headlights 5.

In the present embodiment, the display device 30 is a head-up display that projects a virtual image of the display image displayed on the display element 32 into the user's field of view in a visible manner. Hence, the icon can be displayed in overlap with the foreground visible to the naked eye of the driver 3. This eliminates the need for shifting the line of sight away from the road while driving, as when a display device with a separate display screen is used. The burden on the driver 3 is therefore small, and the icon corresponding to the display target object can be seen more naturally.

Modification to First Embodiment

The display device 30 is a head-up display that projects a virtual image of an image displayed on the display element 32. Therefore, the region on the front windshield 50 where an image from the display device 30 can be projected is limited to a range such that light projected from the projection portion 34 is reflected by the front windshield 50 to enter the eyeball of the driver 3. This region is a limited portion of the front windshield 50 when reflection at the front windshield 50 is specular reflection.

To address this issue, a portion of the optical elements of the optical system 33 in the present embodiment, in particular the front windshield 50, can be configured using a reflection angle control member that reflects at least a portion of light emitted from the display element 32 towards the user's eyeball at a different angle than with specular reflection. Use of a reflection angle control member allows a setting such that light emitted from the projection portion 34 is reflected by the front windshield 50 towards the eyeball of the driver 3, thereby expanding the region of the front windshield 50 usable for image display.

A metasurface, for example, can be used in the reflection angle control member. A metasurface can control the phase of a reflected wave to reflect incident light in any direction.

Figure 11:
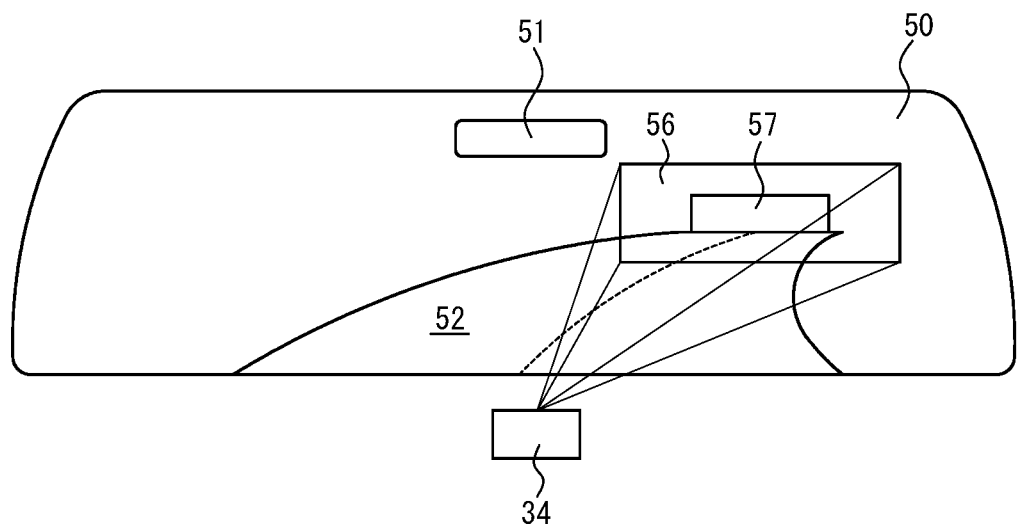
FIG. 11 illustrates display regions of icons when the road ahead curves.

FIG. 11 illustrates the foreground visible through the front windshield 50 when the road ahead curves. Use of a reflection angle control member in a portion or all of the front windshield 50 allows the object detection and display apparatus 1 to move the first projection region 56 and the second projection region 57 in accordance with the curving road. Icons can thus be displayed at appropriate positions for a variety of driving environments, such as a curved, uphill, or downhill road.

Second Embodiment

Figure 12:
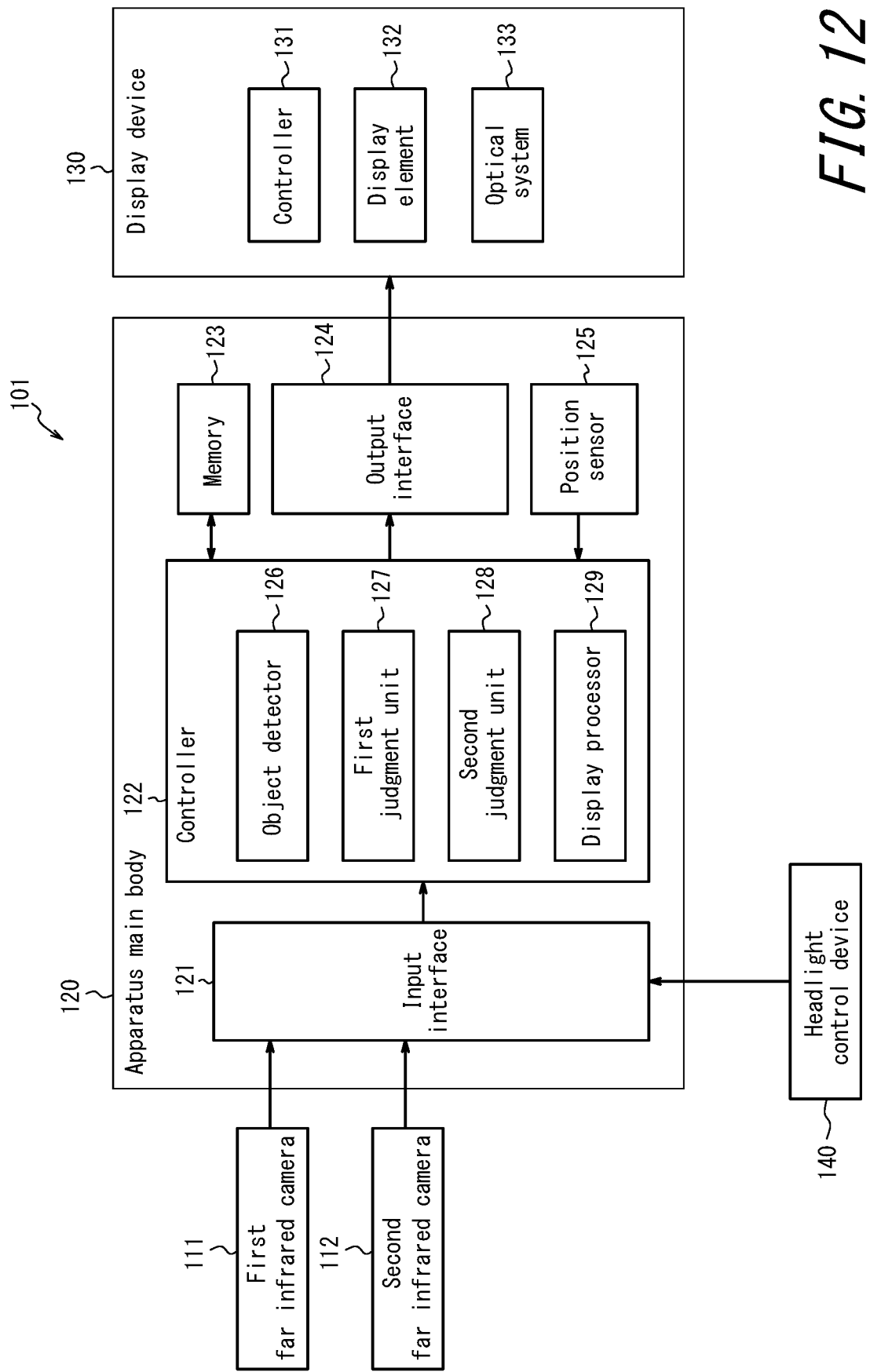
FIG. 12 is a block diagram schematically illustrating the configuration of an object detection and display apparatus according to a second embodiment.

An object detection and display apparatus 101 according to the second embodiment illustrated in FIG. 12 has the structure of the object detection and display apparatus 1 according to the first embodiment, except that instead of the far infrared camera 10, a first far infrared camera 111 and a second far infrared camera 112 are provided. In FIG. 12, constituent elements identical or corresponding to those of the first embodiment are labeled with reference signs yielded by adding 100 to the reference signs of the first embodiment illustrated in FIG. 1. A description of constituent elements identical or corresponding to those of the first embodiment is omitted when the structure or effects thereof do not significantly differ. The same reference signs as in the first embodiment are used when referring to constituent elements not included in FIG. 12.

The object detection and display apparatus 101 includes the first far infrared camera 111, the second far infrared camera 112, an apparatus main body 120, and a display device 130. The apparatus main body 120 includes an input interface 121, a controller 122, a memory 123, an output interface 124, and a position sensor 125. The controller 122 includes the following functional blocks: an object detector 126, a first judgment unit 127, a second judgment unit 128, and a display processor 129. The display device 130 includes a controller 131, a display element 132, and an optical system 133.

The first far infrared camera 111 and the second far infrared camera 112 are a stereo camera in which far infrared cameras have parallax and work together. The first far infrared camera 111 and the second far infrared camera 112 can work together to capture images of an object from two directions. The first far infrared camera 111 and the second far infrared camera 112 may be mounted in one housing. The first far infrared camera 111 and the second far infrared camera 112 may be independent from each other and located at separate positions. The first far infrared camera 111 and the second far infrared camera 112 are attached to the vehicle 2 facing forward with the optical axes in parallel. The term "parallel" here is not limited to strict parallelism and includes tolerance for misalignment during assembly, misalignment during attachment, and misalignment over time. The optical axes of the first far infrared camera 111 and the second far infrared camera 112 are not limited to being parallel. When the optical axes of the first far infrared camera 111 and the second far infrared camera 112 are not parallel, the controller 122 can correct the misalignment in the optical axis direction with image processing. The first far infrared camera 111 and the second far infrared camera 112 are positioned apart from each other in a direction that crosses the optical axes. The first far infrared camera 111 and the second far infrared camera 112 may be arranged side-by-side in the vehicle width direction of the vehicle 2. For example, the first far infrared camera 111 is positioned to the left of the second far infrared camera 112 when facing forward. The second far infrared camera 112 is positioned to the right of the first far infrared camera 111 when facing forward. The first far infrared camera 111 and the second far infrared camera 112 may be fixed to any of the front bumper, the fender grills, the side fenders, and the hood (bonnet).

The first far infrared camera 111 and the second far infrared camera 112 output images having parallax. Distance can be measured using the principle of triangulation on the basis of the difference between coordinates of an object image in the images outputted by the first far infrared camera 111 and the second far infrared camera 112. Hence, the stereo camera composed of the first far infrared camera 111 and the second far infrared camera 112 is also a sensor that measures distance. When the distance acquired from the first far infrared camera 111 and the second far infrared camera 112 is equal to or greater than the distance reached by light (first distance) of the headlights 5, the object detection and display apparatus 101 designates the object as a display target object. The object detection and display apparatus 101 causes the display device 130 to display an icon corresponding to the display target object. This procedure is described below.

Through the input interface 121, the controller 122 acquires a first far infrared image from the first far infrared camera 111 and a second far infrared image from the second far infrared camera 112. The first and second far infrared images are each obtained by forming far infrared radiation emitted by an object into an image. The object detector 126 detects an object from one or both of the first far infrared image and the second far infrared image. The first judgment unit 127 judges the type of object in one or both of the first far infrared image and the second far infrared image for which an object was detected by the object detector 126.

Unlike the first embodiment, the second judgment unit 128 calculates the distance (second distance) from the vehicle 2 to each object using the parallax of the object images included in the first far infrared image and the second far infrared image. The apparatus main body 120 may have a built-in, dedicated calculation element for distance judgment. The distance judgment process performed by the second judgment unit 128 may be executed before the object type judgment process performed by the first judgment unit 127. The distance judgment process performed by the second judgment unit 128 may be executed after the object type judgment process performed by the first judgment unit 127.

The display processor 129 uses the distance calculated by the second judgment unit 128 to determine whether the object included in the first far infrared image and the second far infrared image is a display target object. After the display target object is decided, the display processor 129 can generate a display image on the basis of one or both of the first far infrared image and the second far infrared image and output the display image to the display device 130.

Figure 4:
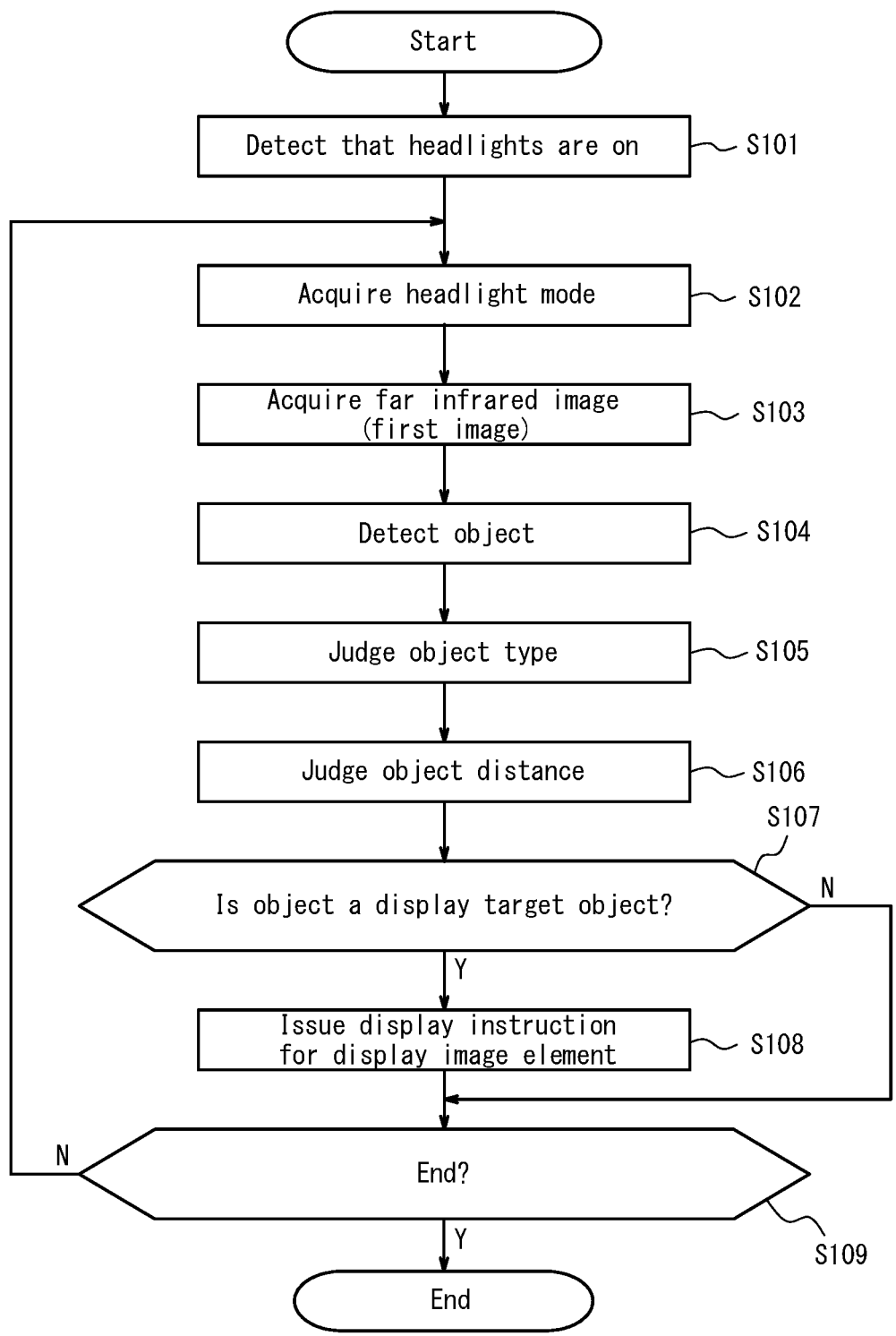
FIG. 4 is a flowchart illustrating an example of processing procedures by a controller in an apparatus main body in the first embodiment.

With regard to other points in the present embodiment, object detection and image display can be performed by nearly the same procedures as those illustrated in the flowchart in FIG. 4. The remaining structure and effects are similar to those of the first embodiment, and hence a description thereof is omitted.

In addition to achieving the effects of the object detection and display apparatus 1 of the first embodiment, the present embodiment can improve the accuracy of distance judgment by the second judgment unit 128 by using the first far infrared camera 111 and the second far infrared camera 112.

Third Embodiment

Figure 13:
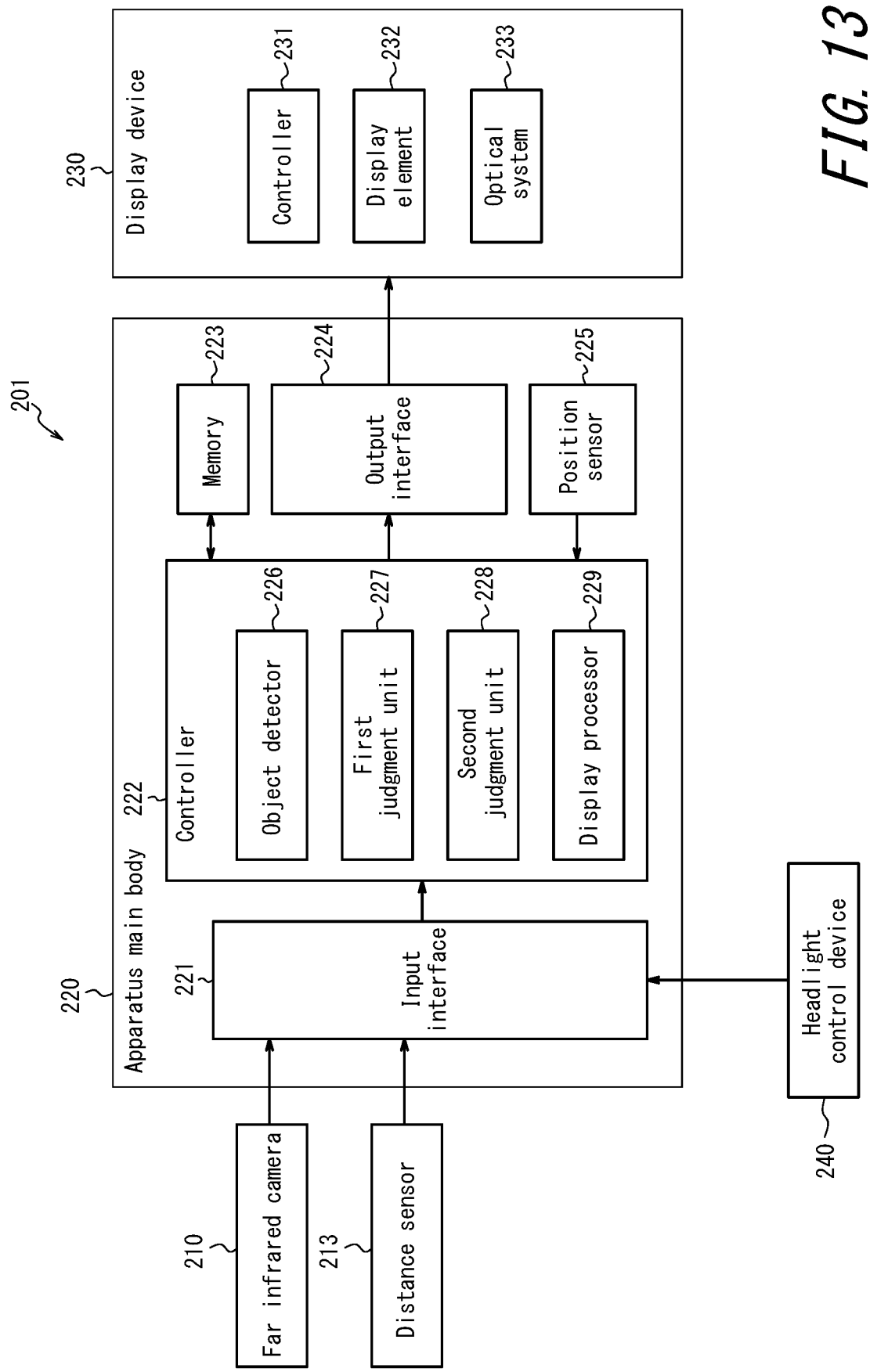
FIG. 13 is a block diagram schematically illustrating the configuration of an object detection and display apparatus according to a third embodiment.

An object detection and display apparatus 201 according to the third embodiment illustrated in FIG. 13 has the structure of the object detection and display apparatus 1 according to the first embodiment, with the addition of a distance sensor 213. In FIG. 13, constituent elements identical or corresponding to those of the first embodiment are labeled with reference signs yielded by adding 200 to the reference signs of the first embodiment illustrated in FIG. 1. A description of constituent elements identical or corresponding to those of the first embodiment is omitted when the structure or effects thereof do not significantly differ. The same reference signs as in the first embodiment are used when referring to constituent elements not included in FIG. 13.

The object detection and display apparatus 201 includes a far infrared camera 210, the distance sensor 213, an apparatus main body 220, and a display device 230. The apparatus main body 220 includes an input interface 221, a controller 222, a memory 223, an output interface 224, and a position sensor 225. The controller 222 includes the following functional blocks: an object detector 226, a first judgment unit 227, a second judgment unit 228, and a display processor 229. The display device 230 includes a controller 231, a display element 232, and an optical system 233.

The distance sensor 213 is a sensor for measuring the distance (second distance) from the vehicle 2 to an object ahead of the vehicle 2. A millimeter wave radar, a laser radar, an ultrasonic sensor, or a combination of these may be used as a sensor that measures distance. These sensors can be mounted onto the vehicle 2 at a variety of positions, like the far infrared camera 10. With automotive radar, electromagnetic waves with a narrow beam width can be scanned rapidly in the horizontal direction to judge the position in the horizontal direction of an object targeted for detection. Alternatively, electromagnetic waves having different directions can be switched between sequentially to judge the position in the horizontal direction. A millimeter wave radar is a sensor that uses millimeter-length radio waves and can be used even in the fog, rain, snow, etc.

The distance sensor 213 outputs distance information to the controller 222 through the input interface 221. On the basis of the distance information acquired from the distance sensor 213, the second judgment unit 228 determines the distance (second distance) to an object in actual space corresponding to an object image in the first image acquired by the far infrared camera 210.

With regard to other points in the present embodiment, object detection and image display can be performed by nearly the same procedures as those illustrated in the flowchart in FIG. 4. The remaining structure and effects are similar to those of the first embodiment, and hence a description thereof is omitted.

In addition to achieving the effects of the first embodiment, the present embodiment can improve the accuracy of distance judgment by the second judgment unit 228 through use of the distance sensor 213. As compared to the second embodiment, the present embodiment dispenses with the need for two far infrared cameras and can reduce the processing load for image processing.

Fourth Embodiment

Figure 14:
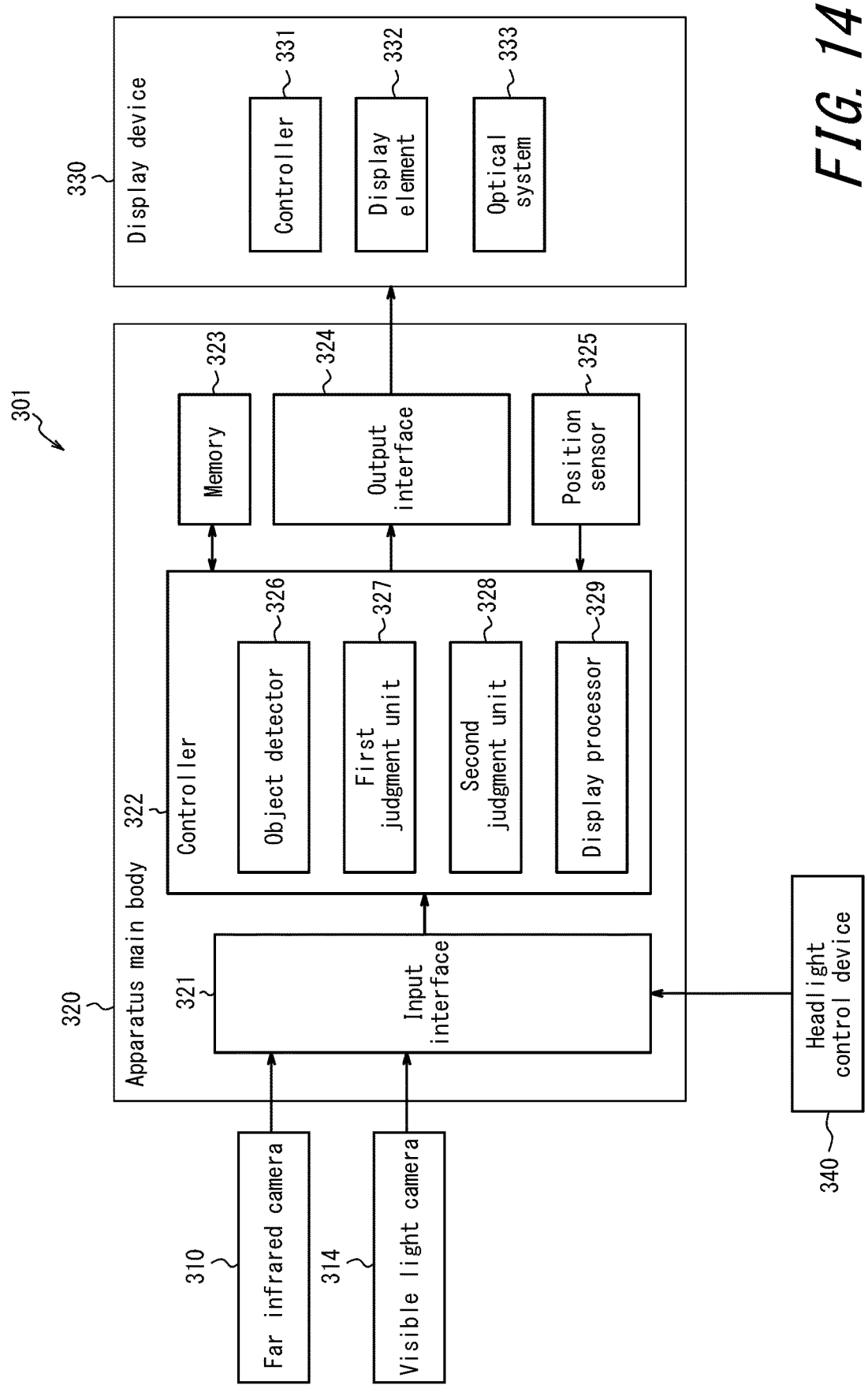
FIG. 14 is a block diagram schematically illustrating the configuration of an object detection and display apparatus according to a fourth embodiment.

An object detection and display apparatus 301 according to the fourth embodiment illustrated in FIG. 14 has the structure of the object detection and display apparatus 1 according to the first embodiment, with the addition of a visible light camera 314. In the present application, a camera that is sensitive to light in the visible light wavelength region is referred to as a visible light camera, and an image captured with the visible light camera is referred to as a visible light image. The visible light image is also referred to as a second image. In FIG. 14, constituent elements identical or corresponding to those of the first embodiment are labeled with reference signs yielded by adding 300 to the reference signs of the first embodiment illustrated in FIG. 1. A description of constituent elements identical or corresponding to those of the first embodiment is omitted when the structure or effects thereof do not significantly differ. The same reference signs as in the first embodiment are used when referring to constituent elements not included in FIG. 14.

The object detection and display apparatus 301 includes a far infrared camera 310, the visible light camera 314, an apparatus main body 320, and a display device 330. The apparatus main body 320 includes an input interface 321, a controller 322, a memory 323, an output interface 324, and a position sensor 325. The controller 322 includes the following functional blocks: an object detector 326, a first judgment unit 327, a second judgment unit 328, and a display processor 329. The display device 330 includes a controller 331, a display element 332, and an optical system 333.

The visible light camera 314 is a camera for capturing images using light having a wavelength in the visible light region. The visible light camera 314 includes an image sensor. The image sensor includes a charge-coupled device (CCD) image sensor or a complementary MOS (CMOS) image sensor. The visible light camera 314 includes an optical system for the image sensor to form an image. The optical system can be formed by one or more lenses. The visible light camera 314 may be a color camera or a black-and-white camera.

The visible light camera 314 may be arranged adjacent to the far infrared camera 310 so that the optical axes of the two cameras are parallel. The visible light camera 314 may be fixed to the vehicle 2 at a similar position as the far infrared camera 310 by a similar method. The visible light camera 314 may be fixed to the vehicle 2 separately, away from the far infrared camera 310. The visible light camera 314 captures an image of a region at least partially the same as the region captured by the far infrared camera 310. The visible light camera 314 may capture an image at the same timing and the same frame rate as the far infrared camera 310. Imaging by the visible light camera 314 and the far infrared camera 310 need not be synchronous.

The visible light camera 314 outputs the captured second image to the controller 322 through the input interface 321. The object detector 326 of the controller 322 also detects an object image from the second image as well as from the first image. For each object detected by the object detector 326 from the first image, the second judgment unit 328 determines whether an object image with a brightness of at least a predetermined value is also detected at the corresponding position in the second image. When an object image is detected at the corresponding position in the second image, the second judgment unit 328 judges that the object is located within the distance reached by light (first distance) of the headlights 5. When an object image is not detected at the corresponding position in the second image for one of the objects detected by the object detector 326 in the first image, the second judgment unit 328 judges that the object is located at a distance equal to or greater than the distance reached by light (first distance) of the headlights 5. When the object image detected in the second image at a position corresponding to the object image detected in the first image has a brightness of a predetermined value or less, the second judgment unit 328 judges that the object is located at a distance equal to or greater than the first distance of the headlights 5.

An example of an object detection and display method for using the object detection and display apparatus 301 to display an image element corresponding to a display target object in the field of view of the driver 3 is described with reference to the flowchart in FIG. 15.

Figure 15:
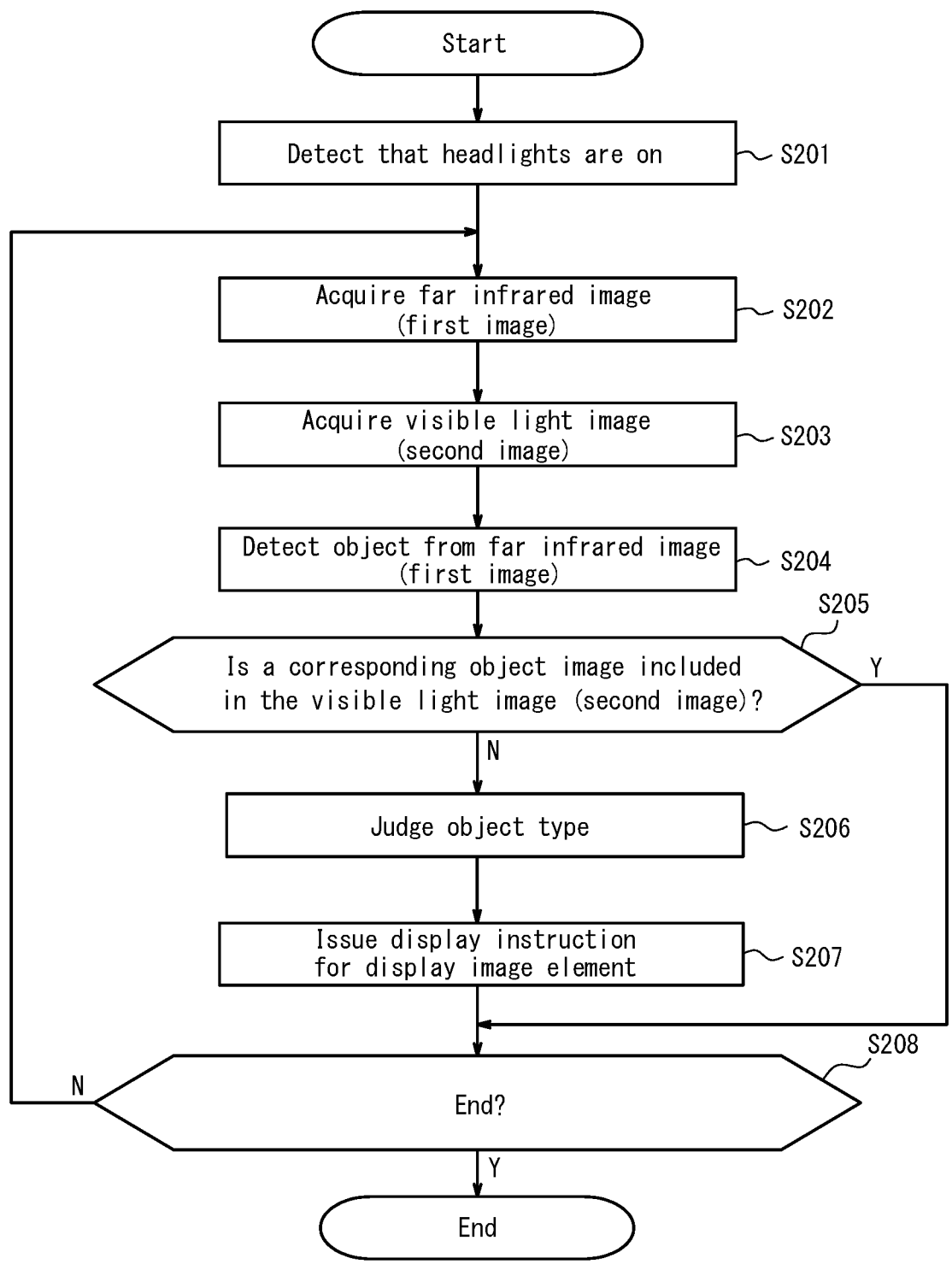
FIG. 15 is a flowchart illustrating an example of processing procedures by a controller of an apparatus main body in the fourth embodiment.

In FIG. 15, step S201 is similar to step S101 of FIG. 4 in the first embodiment. In the present embodiment, the controller 322 does not need to acquire mode selection information of the headlights 5, as in step S102 of the first embodiment. The controller 322 acquires a first image as in step S103 of the first embodiment (step S202). The controller 322 acquires a second image from the visible light camera 314 through the input interface 321 (step S203). The object detector 326 detects an object by detecting an object image in the first image (step S204).

Figure 16:
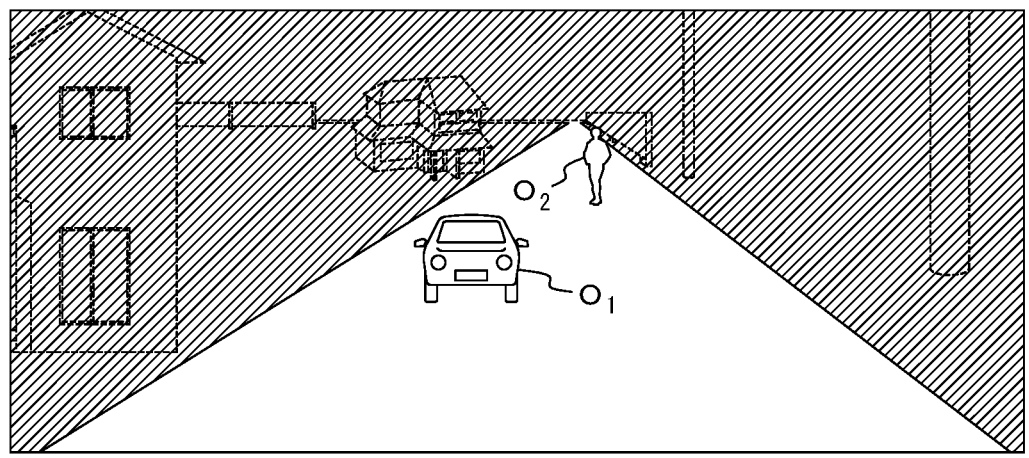
FIG. 16 illustrates an example of a far infrared image (first image)
Figure 17:
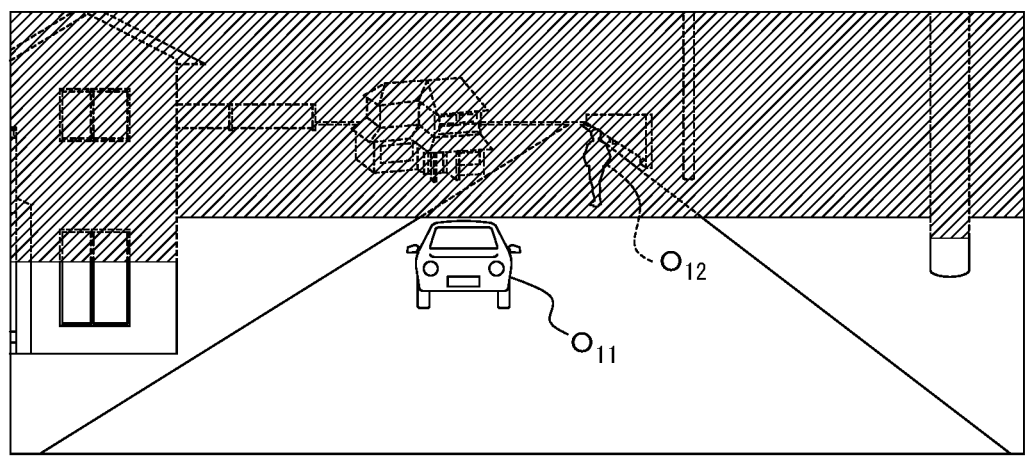
FIG. 17 illustrates an example of a visible light image (second image)

FIG. 16 and FIG. 17 schematically illustrate an example of the first image and the second image for the sake of explanation. An object image $O_1$ and an object image $O_2$ are captured in the first image in FIG. 16. In this example, the headlights 5 are assumed to be in low beam mode. The object image $O_1$ is assumed to correspond to an object located 40 m ahead of the vehicle 2. Furthermore, the object image $O_2$ is assumed to correspond to an object located 80 m ahead of the vehicle 2.

An object image $O_{12}$ of an object at a distance equal to or greater than the first distance of the headlights 5 is not captured in the second image in FIG. 17. By contrast, an object image $O_{11}$ of an object at a shorter distance than the first distance of the headlights 5 is captured. It can therefore be determined whether objects corresponding to the object images $O_1$, $O_2$ are at a distance equal to or greater than the first distance by judging whether object images $O_{11}$, $O_{12}$ corresponding to the object images $O_1$, $O_2$ detected in the first image are included in the second image (step S205). In this way, if the object images $O_{11}$, $O_{12}$ corresponding to the object images $O_1$, $O_2$ detected in the first image are not included in the second image, the second judgment unit 328 judges that the objects are display target objects. Alternatively, when the brightness of the object images $O_{11}$, $O_{12}$ of the second image corresponding to the object images $O_1$, $O_2$ detected in the first image is equal to or less than a predetermined value, the second judgment unit 328 may judge that the objects are display target objects. When an object image corresponding to an object image detected in the first image is included in the second image and has a predetermined brightness or greater, the second judgment unit 328 judges that the object is not a display target object. In the example in FIG. 16 and FIG. 17, the object corresponding to the object image $O_2$ is judged to be a display target object.

Next, the first judgment unit 327 judges the type of object for the object image $O_2$ judged to be the image of a display target object (step S206). In the example in FIG. 16 and FIG. 17, the display target object is a pedestrian. The judgment of the object type by the first judgment unit 327 may be made between step S204 and step S205 instead of after step S205.

Figure 18:
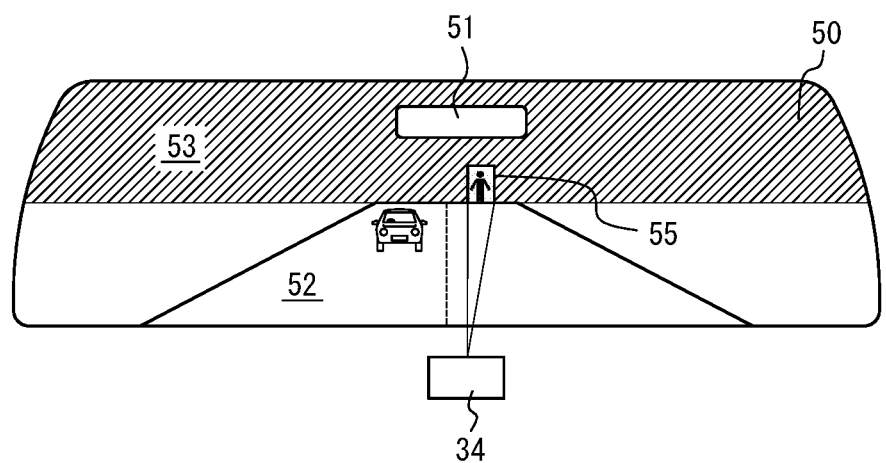
FIG. 18 illustrates projection of an icon onto the front windshield.

The display processor 329 selects an icon corresponding to the type of display target object judged by the first judgment unit 327 in step S206 and causes the display device 330 to display the icon (step S207). At this time, a human icon 55 is displayed as a virtual image in the foreground visible to the driver 3, as illustrated in FIG. 18.

The processing proceeds to step S208 when the object images $O_{11}$, $O_{12}$ corresponding to the object images $O_1$, $O_2$ detected in the first image are in the second image in step S205, or after completion of step S207. In step S208, the processing by the controller 322 returns to step S202 except when an instruction to end the system has been received. Subsequently, the controller 322 repeats the processing from step S202 to step S208.

As described above, the present embodiment can obtain effects similar to those of the first embodiment. Furthermore, the object detection and display apparatus 301 can detect a display target object at a distance equal to or greater than the distance reached by light (first distance) and project the display target object into the field of view of the driver 3 in a visible manner without acquiring mode selection information of the headlights from the headlight control device 340.

Fifth Embodiment

Figure 19:
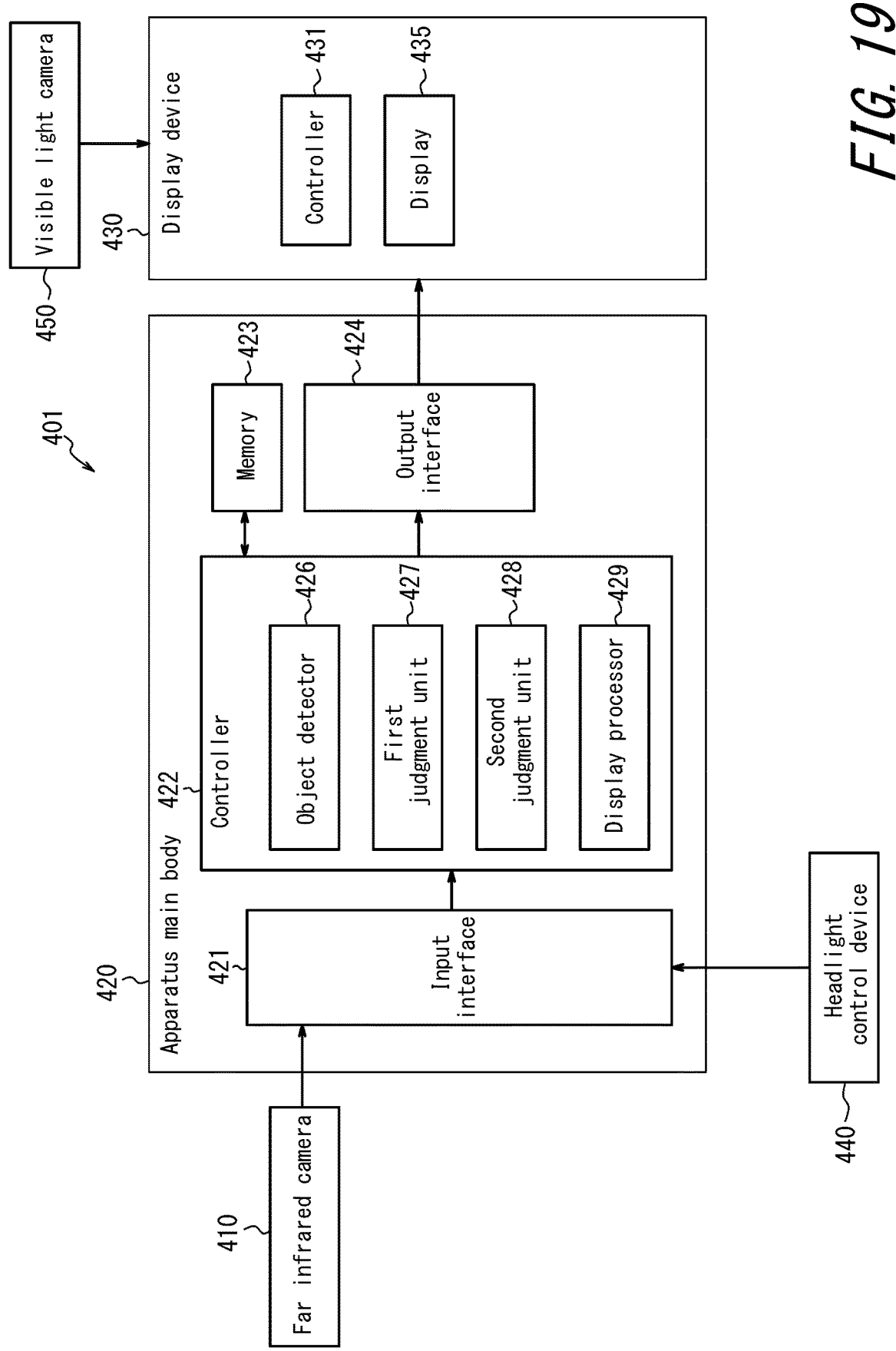
FIG. 19 is a block diagram schematically illustrating the configuration of an object detection and display apparatus according to a fifth embodiment.

An object detection and display apparatus 401 according to the fifth embodiment illustrated in FIG. 19 has the structure of the object detection and display apparatus 1 according to the first embodiment, except that instead of the display device 30, a display device 430 including a flat panel display 435 is used. In FIG. 19, constituent elements identical or corresponding to those of the first embodiment are labeled with reference signs yielded by adding 400 to the reference signs of the first embodiment illustrated in FIG. 1. A description of constituent elements identical or corresponding to those of the first embodiment is omitted when the structure or effects thereof do not significantly differ. The same reference signs as in the first embodiment are used when referring to constituent elements not included in FIG. 19.

The object detection and display apparatus 401 includes a far infrared camera 410, an apparatus main body 420, and the display device 430. The apparatus main body 420 includes an input interface 421, a controller 422, a memory 423, and an output interface 424. The controller 422 includes the following functional blocks: an object detector 426, a first judgment unit 427, a second judgment unit 428, and a display processor 429. The display device 430 includes a controller 431 and the display 435. The display device 430 can display images input from a visible light camera 450 installed in the vehicle 2.

A variety of flat panel displays may be used as the display 435 of the display device 430, such as a liquid crystal display (LCD), an organic EL display, an inorganic EL display, a plasma display panel (PDP), a field emission display (FED), an electrophoretic display, or a twist ball display. The display 435 can be arranged in or on the dashboard of the vehicle 2 with the display surface that displays images facing the driver 3. The display device 430 displays the foreground of the vehicle 2 input from the visible light camera 450. The display device 430 can also double as a display device used for other purposes in the vehicle 2.

The visible light camera 450 is a camera for capturing images using light having a wavelength in the visible light region. The visible light camera 450 can be configured in a similar way to the visible light camera 314 in the fourth embodiment and can be placed at a similar position in the vehicle 2. Unlike the visible light camera 314 of the fourth embodiment, the visible light camera 450 does not output the second image to the apparatus main body 420, but rather outputs the second image directly to the display device 430.

The controller 431 of the display device 430 receives the icon of a display target object, and information on the display position, generated by the display processor 429 of the apparatus main body 420 and outputted by the output interface 424. The controller 431 causes the icon to be displayed in overlap on the image from the visible light camera 450 displayed by the display device 430.

Except for a different display method by the display device 430 in the present embodiment, object detection and image display can be performed by nearly the same procedures as those illustrated in the flowchart in FIG. 4 of the first embodiment. The remaining structure and effects are similar to those of the first embodiment, and hence a description thereof is omitted.

The present embodiment can display an icon indicating a display target object on an image of the foreground displayed on a flat panel display. The display device 430 can also double as the display device of another system, such as a navigation system, provided in the vehicle 2.

Figure 20:
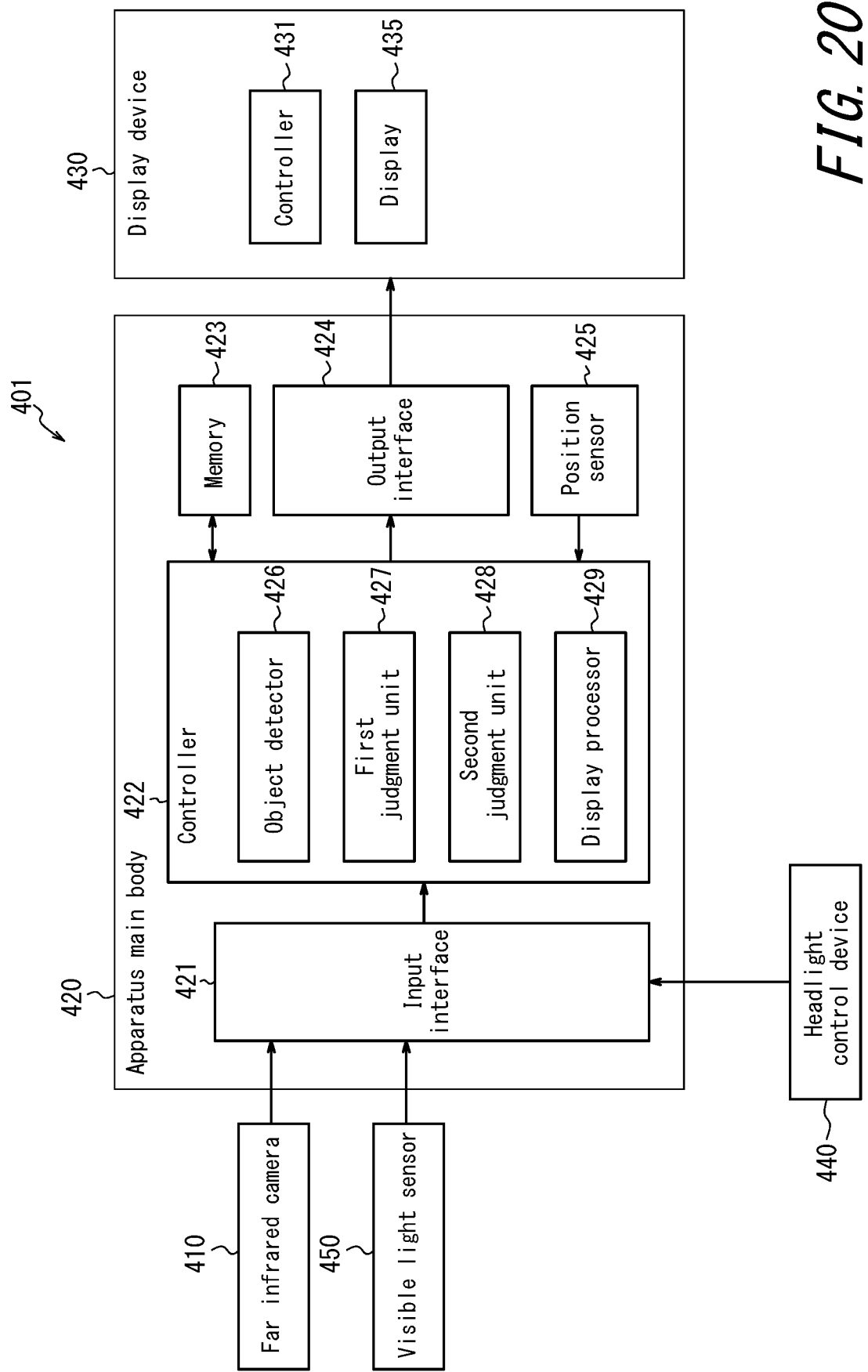
FIG. 20 is a block diagram illustrating an example of an image from a visible light camera passing through the apparatus main body in the object detection and display apparatus according to the fifth embodiment.

In the fifth embodiment, the display device 430 directly receives the image from the visible light camera 450. As illustrated in FIG. 20, however, the image from the visible light camera 450 may be output to the display device 430 through the apparatus main body 420. In this case, the object detection and display apparatus 401 may combine the icon displayed by the display processor 429 with the image of the foreground of the vehicle 2, generate an image to be displayed by the display device 430, and output the image to the display device 430.

The above embodiments have been described as representative examples. However, it will be apparent to one of ordinary skill in the art that numerous modifications and changes may be made to the embodiments within the spirit and scope of the present disclosure. Therefore, the present disclosure should not be interpreted as being restricted to the above embodiments. A variety of changes and modifications may be made without departing from the scope of the appended claims. For example, a plurality of the structural blocks described in the embodiments may be combined into one, or one structural block may be divided into multiple parts. The procedures illustrated in the flowcharts can be reordered to the extent feasible. The procedures illustrated in the flowcharts can also be executed in parallel to the extent feasible.

In the second embodiment through the fourth embodiment, a flat panel display may be used to display images as in the fifth embodiment. The person viewing display images is not limited to the driver. When a head-up display is used as the display device, the display device can be configured so that images are visible to a user in the passenger seat or the back seat. Icons of different sizes in accordance with the distance to the display target object (second distance) may be prepared as icons for display on the display device. The display device is not limited to a head-up display or a flat panel display, and various types of display devices can be used. A cathode ray tube (CRT) or a head-mounted display can also be used as the display device.

A configuration may be adopted to allow the on/off state of the headlights and the selection information of the high/low beam mode to be acquired in conjunction with operation of a headlight switch, instead of being acquired from the headlight control device. Alternatively, these pieces of information may be input manually. The modes of the headlights are not limited to the two high and low beam modes and can be a variety of modes in which the direction or brightness of the headlights is changed.

REFERENCE SIGNS LIST 1, 101, 201, 301, 401, 501 Object detection and display apparatus
2 Vehicle
3 Driver
5 Headlight
10, 210, 310, 410 Far infrared camera
20, 120, 220, 320, 420 Apparatus main body
21, 121, 221, 321, 421 Input interface
22, 122, 222, 322, 422 Controller (processor)
23, 123, 223, 323, 423 Memory
24, 124, 224, 324, 424 Output interface
25, 125, 225, 325 Position sensor
26, 126, 226, 326, 426 Object detector
27, 127, 227, 327, 427 First judgment unit
28, 128, 228, 328, 428 Second judgment unit
29, 129, 229, 329, 429 Display processor
30, 130, 230, 330, 430 Display device
31, 131, 231, 331, 431 Controller
32, 132, 232, 332, 432 Display element
33, 133, 233, 333 Optical system
34 Projection portion
40, 140, 240, 340, 440 Headlight control device
50 Front windshield
51 Rear-view mirror
52 Road surface
53 Non-illuminated region
54 Vehicle icon (image element)
55 Human icon (image element)
56 First projection region
57 Second projection region
61, 62, 63, 64 Icon 111 First far infrared camera
112 Second far infrared camera
213 Distance sensor
314, 450 Visible light camera
435 Display
O, $O_1$, $O_2$ Object image
$l_1$ Low beam distance
$l_2$ High beam distance
$l_3$ Far infrared detection distance
$w_1$ Width

The invention claimed is:

1. An object detection and display apparatus for mounting in a moveable body, comprising:
a far infrared camera;
a display device; and
a processor configured to detect, from a first image outputted by the far infrared camera, an image of a display target object at a distance equal to or greater than a first distance reached by light from a headlight of the moveable body, and to cause the display device to display an image element corresponding to the display target object based on a position of the image of the display target object in the first image,
wherein the processor acquires selection information of a selected mode among a plurality of different modes for the first distance of the headlight and detects the display target object on the basis of the first distance determined in accordance with the selection information,
wherein the processor sets a region of a front windshield of the moveable body onto which the image element is displayed based on the selection information, and
wherein the region of the front windshield of the moveable body onto which the image element is displayed is narrower in size in the mode in which the first distance is longer than in the mode in which the first distance is shorter.

2. The object detection and display apparatus of claim 1, wherein the processor detects an image of an object, from the first image, as the image of the display target object when a second distance from the moveable body to the object is equal to or greater than the first distance, and does not cause the display device to display an image element corresponding to the object when the second distance is less than the first distance.

3. The object detection and display apparatus of claim 1, wherein the processor determines a type of the display target object from the first image, and causes the display device to display the image element as an icon corresponding to the type.

4. The object detection and display apparatus of claim 1, further comprising a sensor configured to measure a second distance from the moveable body to an object included in the first image, wherein the processor acquires the second distance to the object from the sensor, and designates the object as the display target object when the second distance is greater than the first distance.

5. The object detection and display apparatus of claim 1, wherein the processor determines a second distance from the moveable body to an object included in the first image on the basis of a size of an image of the object, and designates the object as the display target object when the second distance is greater than the first distance.

6. The object detection and display apparatus of claim 1, further comprising a visible light camera, wherein the processor designates an object of a plurality of objects included in the first image, as the display target object when an image of a corresponding object is not included in a second image output from the visible light camera, or when a brightness of the image of the corresponding object in the second image is equal to or less than a predetermined value.

7. The object detection and display apparatus of claim 1, wherein the display device includes a head-up display comprising a display element and an optical system, the head-up display configured to project a virtual image of an image displayed on the display element into a field of view of a user.

8. The object detection and display apparatus of claim 7, wherein based on the position of the image of the display target object in the first image, the processor determines a field of view position to display the display target object in the field of view of the user and displays the image element at a corresponding position on the display element from which the display target object is projected.

9. The object detection and display apparatus of claim 7, wherein the optical system comprises a reflection angle control member configured to reflect at least a portion of light emitted from the display element towards the field of view of the user at a different angle than with specular reflection.

10. A moveable body comprising an object detection and display apparatus, the object detection and display apparatus comprising a far infrared camera, a display device, and a processor configured to detect, from a first image outputted by the far infrared camera, an image of a display target object at a distance equal to or greater than a first distance reached by light from a headlight, and to cause the display device to display an image element corresponding to the display target object based on a position of the image of the display target object in the first image,
wherein the processor acquires selection information of a selected mode among a plurality of different modes for the first distance of the headlight and detects the display target object on the basis of the first distance determined in accordance with the selection information,
wherein the processor sets a region of a front windshield of the moveable body onto which the image element is displayed based on the selection information, and
wherein the region of the front windshield of the moveable body onto which the image element is displayed is narrower in size in the mode in which the first distance is longer than in the mode in which the first distance is shorter.

11. An object detection and display method for a moveable body comprising:
acquiring a first image using far infrared radiation;
detecting, from the first image, an image of a display target object at a distance equal to or greater than a first distance reached by light from a headlight of the moveable body; and
displaying an image element corresponding to the display target object based on a position of the image of the display target object in the first image,
wherein the selection information of a selected mode among a plurality of different modes is acquired for the first distance of the headlight and the display target object is detected on the basis of the first distance determined in accordance with the selection information, and
wherein a region of a front windshield of the moveable body onto which the image element is displayed is set based on the selection information, and
wherein the region of the front windshield of the moveable body onto which the image element is displayed is narrower in size in the mode in which the first distance is longer than in the mode in which the first distance is shorter.

* * * * *